United States Patent
Noguchi et al.

(10) Patent No.: US 7,845,483 B2
(45) Date of Patent: Dec. 7, 2010

(54) CONVEYING OPERATION METHOD AND CONVEYING OPERATION DEVICE

(75) Inventors: Sumio Noguchi, Tochigi (JP); Hideya Yamamuro, Tochigi (JP); Mitsugu Takahashi, Tochigi (JP); Masakazu Adachi, Tochici (JP)

(73) Assignee: Honda Motor Co., Ltd., Tokyo (JP)

( * ) Notice: Subject to any disclaimer, the term of this patent is extended or adjusted under 35 U.S.C. 154(b) by 316 days.

(21) Appl. No.: 11/782,276

(22) Filed: Jul. 24, 2007

(65) Prior Publication Data

US 2008/0023295 A1    Jan. 31, 2008

(30) Foreign Application Priority Data

Jul. 25, 2006    (JP)    .............................. 2006-201844
Aug. 4, 2006    (JP)    .............................. 2006-213076

(51) Int. Cl.
| | |
|---|---|
| B65G 43/08 | (2006.01) |
| B65G 49/02 | (2006.01) |
| B65G 15/00 | (2006.01) |
| B65G 17/00 | (2006.01) |
| B65G 47/00 | (2006.01) |
| B65G 47/24 | (2006.01) |
| B65G 47/46 | (2006.01) |
| B65G 47/10 | (2006.01) |

(52) U.S. Cl. ................ 198/346.3; 198/346; 198/343.1; 198/343.2; 198/345.1; 198/345.2; 198/349

(58) Field of Classification Search ............. 198/346.3, 198/346, 343.1, 342.2, 345.1, 345.2, 349
See application file for complete search history.

(56) References Cited

U.S. PATENT DOCUMENTS

| | | | | |
|---|---|---|---|---|
| 4,489,821 A | * | 12/1984 | Inaba et al. | 198/346.2 |
| 6,648,126 B2 | * | 11/2003 | Mayer et al. | 198/465.1 |
| 2005/0115797 A1 | * | 6/2005 | Stone | 198/339.1 |
| 2008/0135382 A1 | * | 6/2008 | Nakamura | 198/463.2 |

FOREIGN PATENT DOCUMENTS

| | | |
|---|---|---|
| JP | S60-085284 | 6/1985 |
| JP | S61-030388 | 2/1986 |

(Continued)

*Primary Examiner*—Gene Crawford
*Assistant Examiner*—Yolanda Cumbess
(74) *Attorney, Agent, or Firm*—Rankin, Hill & Clark LLP

(57) ABSTRACT

A conveying operation method and device that can continue an operation on a workpiece to prevent reduction in production efficiency in conveying a workpiece and performing an operation on the workpiece even if conveyance of the workpiece is stopped during the operation on the workpiece. The workpiece is conveyed by a workpiece conveying device, a movable stand is moved in synchronization with the workpiece conveying device in operation areas along a conveying path, and an operation is performed on the workpiece by an operation device provided on the movable stand. When movement of the workpiece conveying device is stopped, the movable stand stops in synchronization with the workpiece conveying device to continue the operation on the workpiece and complete one cycle operation. When non-normal operation is performed on the workpiece, the workpiece is retracted to a position different from the conveying path while being supported by the movable stand.

12 Claims, 8 Drawing Sheets

FOREIGN PATENT DOCUMENTS

| | | |
|---|---|---|
| JP | 61-146690 | 7/1986 |
| JP | S62-264883 | 11/1987 |
| JP | H01-064386 | 4/1989 |
| JP | 10-264062 | 10/1998 |
| JP | 10264062 A * | 10/1998 |
| JP | 11-334659 | 12/1999 |
| JP | 11334659 A * | 12/1999 |
| JP | 2000-272562 | 10/2000 |
| JP | 2000272562 A * | 10/2000 |
| WO | WO2007013348 * | 1/2007 |

* cited by examiner

CONVEYING OPERATION METHOD AND CONVEYING OPERATION DEVICE

BACKGROUND OF THE INVENTION

1. Field of the Invention

The present invention relates to a conveying operation method and a conveying operation device for conveying a workpiece and performing a predetermined operation on the workpiece.

2. Description of the Related Art

As disclosed in Japanese Patent Laid-Open No. Sho 61-146690, a conveying operation device has been known in which a workpiece is held on a carrier and conveyed, a movable stand provided along a conveying path of the carrier and having operation means such as a robot mounted thereon is moved in synchronization with the carrier, and a predetermined operation is performed on the workpiece under conveyance. In this device, a pair of movable stands are provided on opposite sides of the conveying path of the carrier, and while the movable stands are moved in synchronization with the carrier, receiving devices provided in the movable stands receive and support on the opposite sides of the workpiece, and after completion of the operation by each operation means, the workpiece is returned to the carrier and conveyed.

Generally, such a conveying operation device is provided in each of a plurality of operation areas provided along a conveying path of a carrier in a production line of a workpiece. Thus, operation means provided in each operation area performs a predetermined operation on a workpiece conveyed by the carrier and passing through each operation area.

In the conveying operation device, however, in the case where the operation on the workpiece by the operation means is on the way when the carrier stops while conveying the workpiece, the operation on the workpiece by the operation means is suspended until the conveyance by the carrier is restarted. Thus, the operation is suspended in each operation area in the production line of the workpiece, thereby significantly reducing production efficiency.

In the conveying operation device, only in the case where a normal operation is performed on the workpiece by the operation means such as the robot, the workpiece can be moved along the conveying path and the operation can be efficiency performed, but the workpiece cannot be moved from a position on the conveying path of the carrier to a different position because the workpiece is supported by the pair of movable stands during synchronization movement, and an operation different from the normal operation, such as a teaching operation or an operation test of the operation means such as the robot, has to be performed with the workpiece being placed on the conveying path. Thus, while the operation different from the normal operation is performed on the workpiece, for example, the normal operation cannot be continued even manually by feeding a different workpiece onto the operation area of the operation means, and thus the normal operation in the operation area by the operation means is stopped to reduce production efficiency.

The present invention is achieved in view of such inconvenience, and has an object to provide a conveying operation method and a conveying operation device that can continue an accurate operation on a workpiece to prevent a reduction in production efficiency even if conveyance of the workpiece is stopped during an operation on the workpiece by the operation means, and further can obtain as high production efficiency as in the case of a normal operation even in the case of an operation different from the normal operation.

SUMMARY OF THE INVENTION

The first invention provides a conveying operation method for conveying a workpiece and performing a predetermined operation on the workpiece, including: an operation area conveying step of conveying the workpiece by a workpiece conveying means which holds the workpiece in a predetermined position, and moving a movable stand in synchronization with the workpiece conveying means over an operation area provided along a conveying path of the workpiece by the workpiece conveying means; a workpiece support step of supporting the workpiece separately from the workpiece conveying means by a workpiece support means provided on the movable stand in the operation area conveying step; and an operation step of performing a predetermined operation on the workpiece supported by the workpiece support means by an operation means mounted on the movable stand, wherein the operation step includes: a conveying time operation step of completing the predetermined operation on the workpiece with the movable stand being moved in synchronization with the movement of the workpiece conveying means in the operation area; and a stop time operation step of stopping the movable stand in synchronization with the workpiece conveying means and completing the predetermined operation on the workpiece when the movement of the workpiece conveying means is stopped in the operation area and the conveying time operation step is suspended.

According to the first invention, the workpiece support step and the operation step are performed in the operation area conveying step. In the workpiece support step, the workpiece held by the workpiece conveying means is supported by the workpiece support means of the movable stand moved in synchronization with the workpiece conveying means. This allows a relative position between the workpiece in the workpiece support means and the operation means to be maintained with high accuracy, and allows the operation by the operation means to be performed with high accuracy. In the operation step, the conveying time operation step and the stop time operation step are selectively performed depending on circumstances. Specifically, in the conveying time operation step, the predetermined operation (for example, a normal operation such as an assembly operation) on the workpiece moved along the conveying path in the operation area is completed. The workpiece supported by the workpiece support means of the movable stand and having been subjected to the predetermined operation is transferred to the workpiece conveying means moved on a trailing end side of the operation area, and the movable stand is returned to a leading end side of the operation area. In the conveying time operation step, the movable stand synchronizes with the movement of the workpiece conveying means, and thus the predetermined operation on the workpiece can be completed while the workpiece conveying means is passing through the operation area, thereby obtaining extremely high production efficiency.

Also, the stop time operation step is performed when the movement of the workpiece conveying means is stopped in the operation area and the conveying time operation step is suspended. The workpiece conveying means is sometimes stopped by an operator when an abnormality or the like occurs. At this time, the conveying time operation step is stopped, and the predetermined operation on the workpiece is also suspended. Thus, in the present invention, when the movement of the workpiece conveying means is stopped, the stop time operation step is performed to continue the operation on the workpiece and complete the predetermined operation. Thus, the operation on the workpiece can be completed while the workpiece conveying means is stopped in the operation area, and further, the workpiece having been subjected to the operation can be transferred from the workpiece support means on the movable stand to the stopped workpiece conveying means.

Thus, the operation on the workpiece can be completed and the movable stand can be returned to the leading end side of the operation area without waiting for the return of the workpiece conveying means, thereby allowing the conveying time operation step to be quickly performed when the workpiece conveying means is returned, and preventing a reduction in production efficiency caused by the stop of the workpiece conveying means.

In the second invention, the movable stand includes a drive motor that drives the movement in the operation area in the operation area conveying step, and torque of the drive motor is controlled in accordance with a moving speed of the workpiece conveying means in the conveying time operation step and the stop time operation step in the first invention.

According to the second invention, the drive motor of the movable stand is torque controlled in the operation area in accordance with the moving speed of the workpiece conveying means, and thus the transfer of the workpiece from the workpiece conveying means to the workpiece support means on the leading end side of the operation area, and the transfer of the workpiece from the workpiece support means to the workpiece conveying means on the trailing end side of the operation area can be performed with high accuracy.

When the workpiece conveying means is stopped by a stop operation by an operator, for example, the workpiece conveying means is gradually reduced in speed by the inertia in movement and stopped. At this time, the drive motor of the movable stand is torque controlled in accordance with the moving speed of the workpiece conveying means, and thus the movable stand can be reduced in speed in synchronization with a reduction in speed of the workpiece conveying means under stop, and stopped in synchronization with the workpiece conveying means. This prevents a sudden stop of the movable stand, and allows the movable stand to be stopped without exerting a shock on the workpiece, thereby allowing the predetermined operation in the stop time operation step to be smoothly continued.

In the third invention, the workpiece conveying means is circulated in the conveying path formed in an endless manner, a plurality of operation areas in which different operations are performed on the workpiece are provided along the conveying path, and the operation step is independently performed for each operation area in the first invention or the second invention.

According to the third invention, each operation step can be performed while the workpiece conveying means is moved in the endless manner and passes through each operation area, thereby increasing production efficiency. Further, the stop time operation step is performed in each operation area, and thus even if the workpiece conveying means is stopped, each operation step can be performed in each operation area, thereby preventing a reduction in production efficiency caused by the stop of the workpiece conveying means.

In the fourth invention, the method further includes: a retraction step of retracting the workpiece support means supporting the workpiece from a position on the conveying path of the workpiece by the workpiece conveying means to a different position with a relative arrangement between the workpiece support means and the operation means being maintained in the operation area; and a different operation step of performing a different predetermined operation on the workpiece supported by the workpiece support means by the operation means when the workpiece support means is retracted to the different position in the retraction step in any one of the first to third inventions.

According to the fourth invention, in the retraction step, the workpiece support means supporting the workpiece can be retracted from the position on the conveying path of the workpiece by the workpiece conveying means to the different position, and the operation means can perform the different predetermined operation (for example, an operation different from a normal operation, such as a teaching operation or an operation test of the operation means). At this time, the workpiece conveying means can convey the different workpiece to the position where the operation means performs the predetermined operation (that is, the position on the conveying path of the workpiece by the workpiece conveying means), and thus the predetermined operation to be performed by the operation means can be continued, for example, manually by the operator while the operation means performs the different predetermined operation, thereby preventing a reduction in production efficiency caused by the different predetermined operation by the operation means.

The fifth invention provides a conveying operation method for conveying a workpiece and performing a predetermined operation on the workpiece, including: an operation area conveying step of conveying the workpiece by a workpiece conveying means which holds the workpiece in a predetermined position, and moving a movable stand in synchronization with the workpiece conveying means over an operation area provided along a conveying path of the workpiece by the workpiece conveying means; and a workpiece support step of supporting the workpiece separately from the workpiece conveying means by a workpiece support means provided on the movable stand in the operation area conveying step; an operation step of performing a predetermined operation on the workpiece supported by the workpiece support means by an operation means mounted on the movable stand; a retraction step of retracting the workpiece support means supporting the workpiece from a position on the conveying path of the workpiece by the workpiece conveying means to a different position with a relative arrangement between the workpiece support means and the operation means being maintained; and a different operation step of performing a different predetermined operation on the workpiece supported by the workpiece support means by the operation means when the workpiece support means is retracted to the different position in the retraction step.

According to the fifth invention, as in the first invention, the workpiece support step and the operation step are performed in the operation area conveying step. At this time, as described above, in the workpiece support step, the relative position between the workpiece of the workpiece support means and the operation means can be maintained with high accuracy, thereby allowing the predetermined operation (for example, a normal operation such as an assembly operation) to be performed by the operation means with high accuracy.

Also, when a different predetermined operation (for example, an operation different from the normal operation, such as a teaching operation or an operation test of the operation means) is performed by the operation means, the workpiece support means supporting the workpiece is retracted from the position on the conveying path of the workpiece by the workpiece conveying means to the different position in the retraction step. At this time, the workpiece is kept supported by the workpiece support means, thereby allowing the different predetermined operation to be performed by the operation means with high accuracy. Further, in the retraction step, the workpiece support means supports the workpiece in the position different from the position on the conveying path of the workpiece by the workpiece conveying means, and thus the workpiece conveying means can convey the different workpiece to the position where the operation means performs the predetermined operation (that is, the position on the conveying path of the workpiece by the workpiece conveying means). Thus, the predetermined operation to be performed by the operation means can be continued, for example, manually by the operator while the operation means performs the different predetermined operation, thereby preventing a reduction in production efficiency caused by the different predetermined operation by the operation means.

In the sixth invention, the operation step includes: a conveying time operation step of completing the predetermined operation on the workpiece with the movable stand being moved in synchronization with the movement of the workpiece conveying means in the operation area; and a stop time operation step of stopping the movable stand in synchronization with the workpiece conveying means and completing the predetermined operation on the workpiece when the movement of the workpiece conveying means is stopped in the operation area and the conveying time operation step is suspended in the fifth invention.

According to the sixth invention, as in the first invention, in the operation step, the conveying time operation step and the stop time operation step can be selectively performed depending on circumstances. Specifically, in the conveying time operation step, the predetermined operation on the workpiece moved along the conveying path in the operation area is completed. In the stop time operation step, the operation on the workpiece is continued to complete the predetermined operation when the movement of the workpiece conveying means is stopped in the operation area and the conveying time operation step is suspended. Thus, even if the workpiece conveying means is stopped in the operation area, the operation on the workpiece can be completed during the stop, thereby preventing a reduction in production efficiency caused by the stop of the workpiece conveying means.

In the seventh invention, the movable stand includes a drive motor that drives the movement in the operation area in the operation area conveying step, and the drive motor is torque controlled in accordance with the moving speed of the workpiece conveying means in the conveying time operation step and the stop time operation step in the sixth invention.

According to the seventh invention, as in the second invention, the workpiece can be transferred between the workpiece conveying means and the workpiece support means with high accuracy, and also when the workpiece conveying means is gradually reduced in speed and stopped, the movable stand can be stopped in synchronization with the workpiece conveying means by the torque control of the drive motor. This prevents a sudden stop of the movable stand, and allows the movable stand to be stopped without exerting a shock on the workpiece.

In the eighth invention, the workpiece conveying means is circulated in the conveying path formed in an endless manner, a plurality of operation areas in which different operations are performed on the workpiece are provided along the conveying path, and the operation step is independently performed for each operation area in the sixth invention or the seventh invention.

According to the eighth invention, as in the third invention, each operation step can be performed while the workpiece conveying means is moved in the endless manner and passes through each operation area, thereby increasing production efficiency. Further, the stop time operation step is performed in each operation area, and thus even if the workpiece conveying means is stopped, each operation step can be performed in each operation area, thereby preventing a reduction in production efficiency caused by the stop of the workpiece conveying means.

The ninth invention provides a conveying operation device for conveying a workpiece and performing a predetermined operation on the workpiece, including: a workpiece conveying means which holds the workpiece in a predetermined position for conveying the workpiece; an operation area provided over a predetermined distance along a conveying path of the workpiece by the workpiece conveying means; a movable stand that is moved in synchronization with the workpiece conveying means along the conveying path of the workpiece by the workpiece conveying means in the operation area; a workpiece support means provided on the movable stand for supporting the workpiece separately from the workpiece conveying means; an operation means provided on the movable stand for performing a predetermined operation on the workpiece supported by the workpiece support means; a movable stand driving means for moving the movable stand over the operation area; a movable stand driving control means for controlling the movable stand driving means so that a moving speed of the movable stand by the movable stand driving means matches with a moving speed of the workpiece conveying means; and an operation control means for completing the predetermined operation on the workpiece by the operation means in the operation area when the movable stand is moved along the conveying path of the workpiece by the workpiece conveying means, wherein when the movement of the workpiece conveying means is stopped in a middle position of the operation area during the operation by the operation means, the movable stand driving control means stops the movable stand in synchronization with the workpiece conveying means, and the operation control means completes the predetermined operation performed by the operation means in the operation area.

According to the ninth invention, when the workpiece conveying means conveys the workpiece and enters the operation area, the workpiece support means of the movable stand receives the workpiece from the workpiece conveying means on the leading end side of operation area, and the operation means performs the predetermined operation on the workpiece by control by the operation control means. During this time, the workpiece conveying means and the movable stand are moved in synchronization with each other, and while the workpiece conveying means is passing through the operation area, the predetermined operation by the operation means is completed by the control by the operation control means. Then, the workpiece in the workpiece support means of the movable stand is transferred to the workpiece conveying means on the trailing end side of the operation area, and the movable stand is returned to the leading end side of the operation area by driving by the movable stand driving means.

On the other hand, when the movement of the workpiece conveying means is stopped during the operation by the operation means, the movable stand driving control means controls the movable stand driving means so that the moving speed of the movable stand matches with the moving speed of the workpiece conveying means. Thus, also when the workpiece conveying means is gradually reduced in speed by the inertia in movement to stop, the speed of the movable stand can be reduced in accordance therewith, and the movable stand can be stopped in synchronization with the workpiece conveying means while being prevented from a sudden stop. Thus, the movable stand can be stopped without exerting a shock on the workpiece, thereby allowing the predetermined operation after the stop of the movable stand to be smoothly continued. Then, the operation control means completes the predetermined operation performed by the operation means in the operation area even with the workpiece conveying means and the movable stand being stopped. Thus, the workpiece having been subjected to the predetermined operation can be immediately transferred from the workpiece support means to the workpiece conveying means, and the movable stand can be returned to the leading end of the operation area. Therefore, when the movement of the workpiece conveying means is restarted, an operation on a workpiece subsequently conveyed to the workpiece conveying means can be ready. In this manner, even if the workpiece conveying means is stopped, the predetermined operation performed by the operation means in the operation area can be completed, thereby preventing a reduction in production efficiency caused by the stop of the workpiece conveying means.

In the tenth invention, the movable stand driving means is a drive motor, and the movable stand driving control means controls torque of the drive motor to control the movement of the movable stand in accordance with the moving speed of the workpiece conveying means in the ninth invention.

According to the tenth invention, when the movement of the workpiece conveying means is stopped, the drive motor that drives the movable stand is stopped in accordance with the moving speed of the workpiece conveying means by the torque control of the movable stand driving control means, thereby allowing the workpiece conveying means and the movable stand to be stopped in synchronization with each other with high accuracy.

In the eleventh invention, the workpiece conveying means is circulated in the conveying path formed in an endless manner, a plurality of operation areas in which different operations are performed on the workpiece are provided along the conveying path, and the movable stand is independently provided for each operation area in the ninth invention or the tenth invention.

According to the eleventh invention, the operation by each operation means can be efficiently performed while the workpiece conveying means is moved in the endless manner and passes through each operation area, thereby increasing production efficiency. Further, each operation area includes the operation control means, and thus even if the workpiece conveying means is stopped, the predetermined operation by each operation means in each operation area can be continued, thereby preventing a reduction in production efficiency caused by the stop of the workpiece conveying means.

In the twelfth invention, the device further includes retraction means provided on the movable stand for retracting the workpiece support means supporting the workpiece from a position on the conveying path of the workpiece by the workpiece conveying means to a different position with a relative position between the workpiece support means and the operation means being maintained, and the operation control means performs a different predetermined operation on the workpiece supported by the workpiece support means when the retraction means retracts the workpiece support means to the different position in any one of the ninth to eleventh inventions.

According to the twelfth invention, the retraction means retracts the workpiece from the position on the conveying path to the different position, and the operation control means can perform the different predetermined operation on the workpiece retracted to the different position. Thus, the workpiece conveying means can convey the different workpiece to the position where the operation means performs the predetermined operation (that is, the position on the conveying path of the workpiece by the workpiece conveying means), and the predetermined operation to be performed by the operation means can be continued, for example, manually by an operator while the operation means performs the different predetermined operation, thereby preventing a reduction in production efficiency caused by the different predetermined operation by the operation means.

The thirteenth invention provides a conveying operation device for conveying a workpiece and performing a predetermined operation on the workpiece, including: a workpiece conveying means which holds the workpiece in a predetermined position and conveying the workpiece; an operation area provided over a predetermined distance along a conveying path of the workpiece by the workpiece conveying means; a movable stand that is moved along the conveying path of the workpiece by the workpiece conveying means in the operation area in synchronization with the workpiece conveying means; a workpiece support means provided on the movable stand for supporting the workpiece separately from the workpiece conveying means; an operation means provided on the movable stand for performing a predetermined operation on the workpiece supported by the workpiece support means; an operation control means for completing the predetermined operation on the workpiece by the operation means in the operation area; and a retraction means provided on the movable stand for retracting the workpiece support means supporting the workpiece from a position on the conveying path of the workpiece by the workpiece conveying means to a different position with a relative position between the workpiece support means and the operation means being maintained, wherein the operation control means operates a different predetermined operation on the workpiece supported by the workpiece support means when the retraction means retracts the workpiece support means to the different position.

According to the thirteenth invention, the workpiece held and conveyed by the workpiece conveying means is supported by the workpiece support means of the movable stand moved in synchronization with the workpiece conveying means, and the operation means performs the predetermined operation on the workpiece supported by the workpiece support means. While the operation means performs the predetermined operation, the movable stand is moved in synchronization with the workpiece conveying means, and thus after the completion of the predetermined operation by the operation means, the workpiece in the workpiece support means can be transferred to the moving workpiece conveying means, thereby allowing an efficient operation to be performed without stopping the workpiece conveying means.

The retraction means is provided to retract the workpiece support means supporting the workpiece from the position on the conveying path of the workpiece by the workpiece conveying means to the different position. Then, the operation control means controls the operation means so as to perform the different predetermined operation on the workpiece retracted by the workpiece support means to the position different from the workpiece conveying means, and thus the different predetermined operation can be performed on the workpiece with the workpiece being separated from the workpiece conveying means. Thus, the different workpiece can be conveyed by the workpiece conveying means to the position where the operation means performs the predetermined operation (that is, the position on the conveying path of the workpiece by the workpiece conveying means), and the predetermined operation to be performed by the operation means can be continued, for example, manually by the operator while the operation means performs the different predetermined operation, thereby preventing a reduction in production efficiency caused by the different predetermined operation by the operation means.

In the fourteenth invention, the conveying operation device includes: a movable stand driving means for moving the movable stand over the operation area; and a movable stand driving control means for controlling the movable stand driving means so that a moving speed of the movable stand by the movable stand driving means matches with a moving speed of the workpiece conveying means, wherein when the movement of the workpiece conveying means is stopped in a middle position of the operation area during the operation by the operation means, the movable stand driving control means stops the movable stand in synchronization with the workpiece conveying means, and the operation control means completes the predetermined operation performed by the operation means in the operation area in the thirteenth invention.

According to the fourteenth invention, as in the ninth invention, even if the workpiece conveying means and the movable stand are stopped, the operation control means completes the predetermined operation by the operation means in the operation area, thereby preventing a reduction in production efficiency caused by the stop of the workpiece conveying means.

In the fifteenth invention, the movable stand driving means is a drive motor, and the movable stand driving control means torque controls the drive motor to control the movement of the movable stand in accordance with the moving speed of the workpiece conveying means in the fourteenth invention.

According to the fifteenth invention, as in the tenth invention, when the workpiece conveying means is stopped, the drive motor that drives the movable stand is stopped in accordance with the moving speed of the workpiece conveying means by the torque control of the movable stand driving control means, thereby allowing the workpiece conveying means and the movable stand to be stopped in synchronization with each other with high accuracy.

In the sixteenth invention, the workpiece conveying means is circulated in the conveying path formed in an endless shape, a plurality of operation areas in which different operations are performed on the workpiece are provided along the conveying path, and the movable stand is independently provided for each operation area in the fourteenth invention or the fifteenth invention.

According to the sixteenth invention, as in the eleventh invention, the operation by each operation means is efficiently performed while the workpiece conveying means is moved in the endless manner and passes through each operation area, thereby increasing production efficiency. Further, each operation area includes the operation control means, and thus even if the workpiece conveying means is stopped, the predetermined operation by each operation means in each operation area can be continued, thereby preventing a reduction in production efficiency caused by the stop of the workpiece conveying means.

DETAILED DESCRIPTION OF THE PREFERRED EMBODIMENTS

Figure 1:
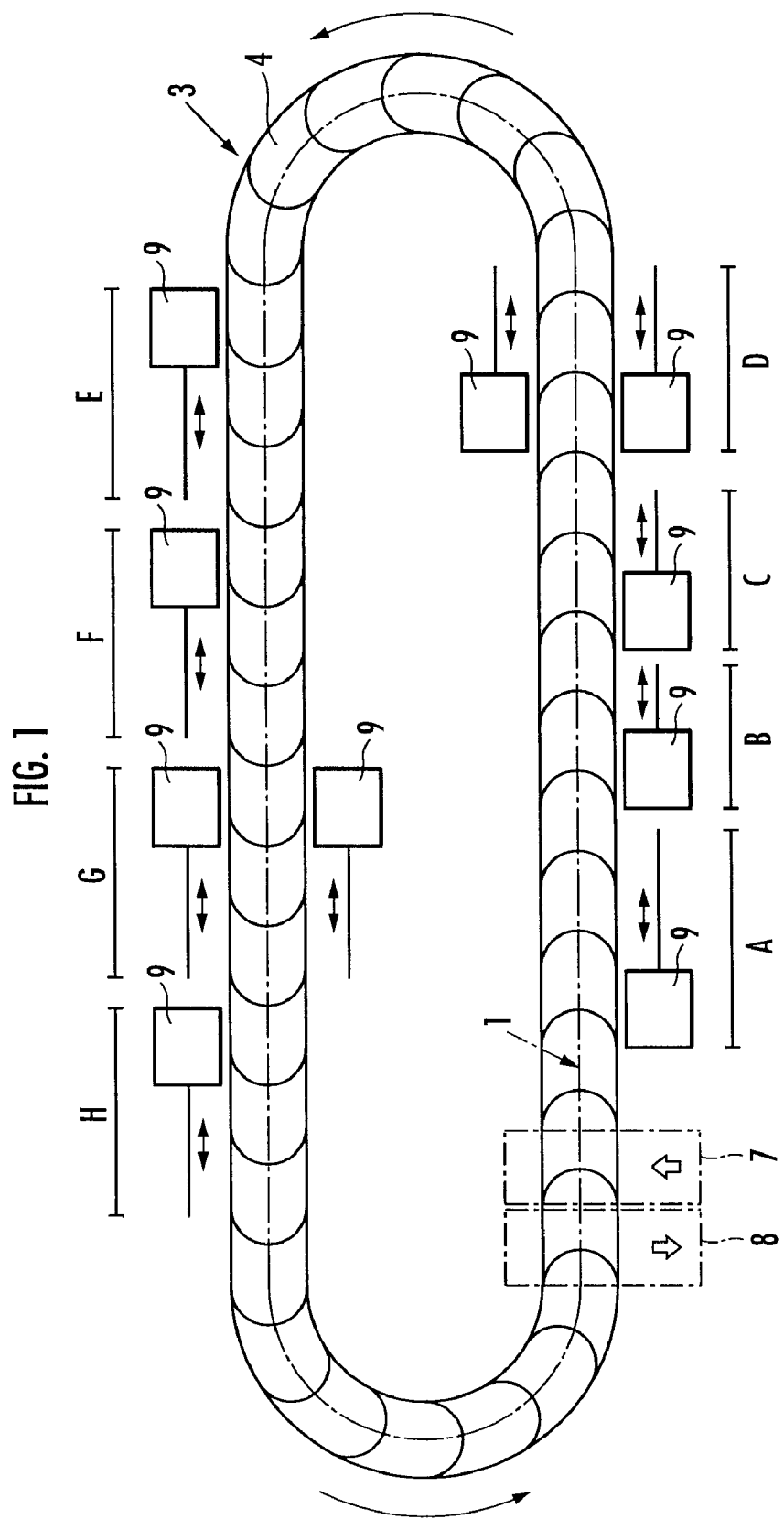
FIG. 1 schematically illustrates a production line including a conveying operation device of the present invention.
Figure 2:
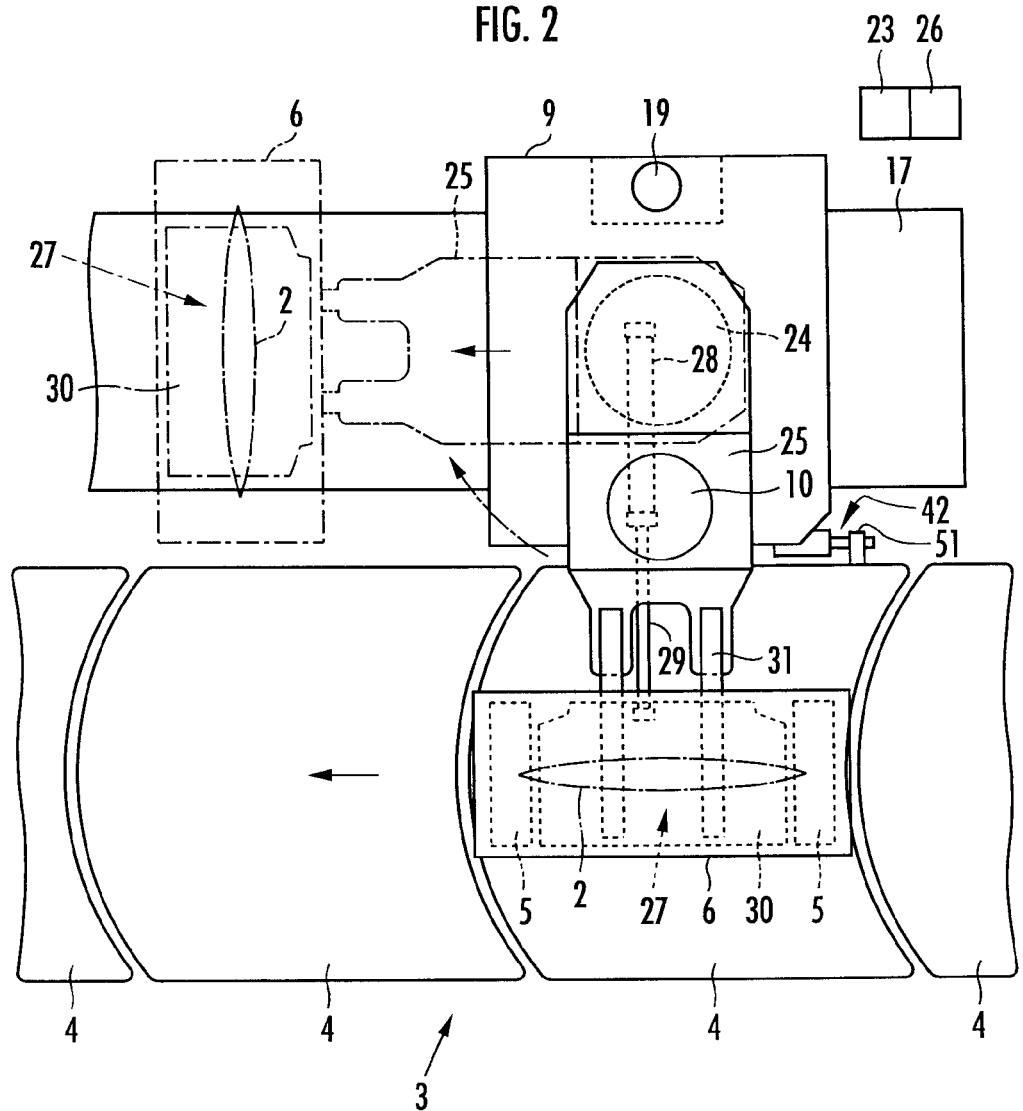
FIG. 2 is a schematic plan view of a conveying operation device according to an embodiment of the present invention.
Figure 3:
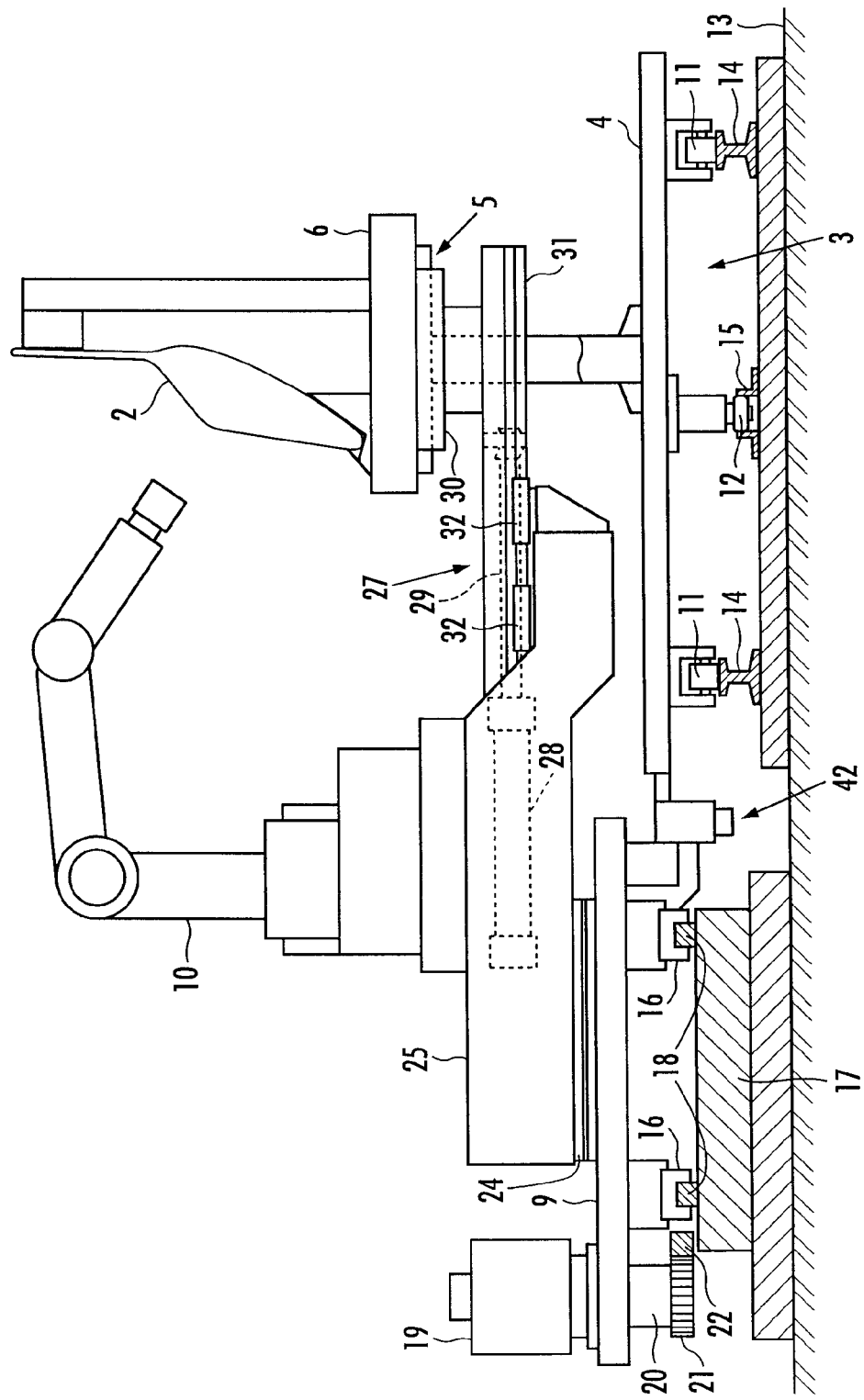
FIG. 3 is a schematic side view of the conveying operation device of the embodiment.

A conveying operation device according to an embodiment is provided as a door production line of automobiles, and includes endless workpiece conveying means 3 for conveying workpieces 2 (see FIGS. 2 and 3) that are automobile doors along an oval conveying path 1 as shown in FIG. 1. The workpiece conveying means 3 is a conveyor having a conveying surface formed by connecting a plurality of moving plates 4 in an endless shape, and the moving plates 4 are circulated along the oval conveying path by driving by unshown driving means. The workpiece conveying means 3 holds the workpieces 2 at predetermined intervals. More specifically, as shown in FIGS. 2 and 3, the workpiece 2 is held in the workpiece conveying means 3 by a plurality of workpiece holding portions 5 provided at predetermined intervals on each moving plate 4. The workpiece 2 is held by the workpiece holding portions 5 while being supported by a pallet 6, and the pallet 6 is removably held by the workpiece holding portions 5.

As shown in FIG. 1, in part of the conveying path 1, a feeding portion 7 that feeds the workpiece 2 onto the workpiece holding portion 5 of the workpiece conveying means 3, and an ejecting portion 8 that ejects the workpiece 2 on the workpiece holding portion 5 are provided. The workpiece conveying means 3 can be stopped by an operation by an operator if required or if some problem occurs on the conveying path 1, and in the embodiment, a plurality of unshown emergency stop buttons for stopping the workpiece conveying means 3 are provided around the conveying path 1.

Further, as shown in FIG. 1, in the conveying path 1 by the workpiece conveying means 3, a plurality of operation areas A to H are provided from an upstream side to a downstream side, and in the operation areas A to H, different predetermined operations are performed on the workpiece 2 on the workpiece holding portion 5 conveyed by the workpiece conveying means 3 and passing through the operation areas. In each of the operation areas A to H, as shown in FIG. 2, a movable stand 9 that is movable along the conveying path of the workpiece conveying means 3 is provided. The movable stand 9 includes operation means 10 such as a robot, and is movable over the substantially entire length of the corresponding operation area.

With reference to FIG. 1, the workpiece conveying means 3 conveys the workpiece 2 in one direction. On the other hand, the movable stand 9 is moved in the same direction as the conveying direction of the workpiece conveying means 3 in synchronization therewith when the predetermined operation is performed on the workpiece 2 that is conveyed by the workpiece conveying means 3 and passes through the operation area. Then, the predetermined operation on the workpiece 2 is completed until the workpiece 2 is moved to a trailing end of the corresponding operation area. Then, the movable stand 9 is moved in the direction opposite from the conveying direction of the workpiece conveying means 3 and on standby at a leading end of the operation area before the workpiece 2 conveyed next enters the operation area. Thus, the plurality of workpieces 2 continuously fed from the feeding portion 7 onto the workpiece conveying means 3 are subjected to each operation while keeping the state of being conveyed from the most upstream operation area A to the most downstream operation area H, and the workpieces 2 having passed through the most downstream operation area H are continuously ejected from the workpiece conveying means 3 by the ejecting portion 8 adjacent to the feeding portion 7.

As shown in FIG. 3, the moving plate 4 of the workpiece conveying means 3 in the embodiment includes a plurality of conveying rollers 11 on opposite sides on a lower surface thereof, and a guide roller 12 in the middle on the lower surface. The conveying roller 11 rolls on a conveying rail 14 provided on a floor 13 along the conveying path 1 (see FIG. 1), and the guide roller 12 is guided in the conveying direction so as to be held by a guide rail 15 extending on the floor 13 along the conveying path 1. The moving plate 4 of the workpiece conveying means 2 is circulated by unshown driving means.

Figure 4:
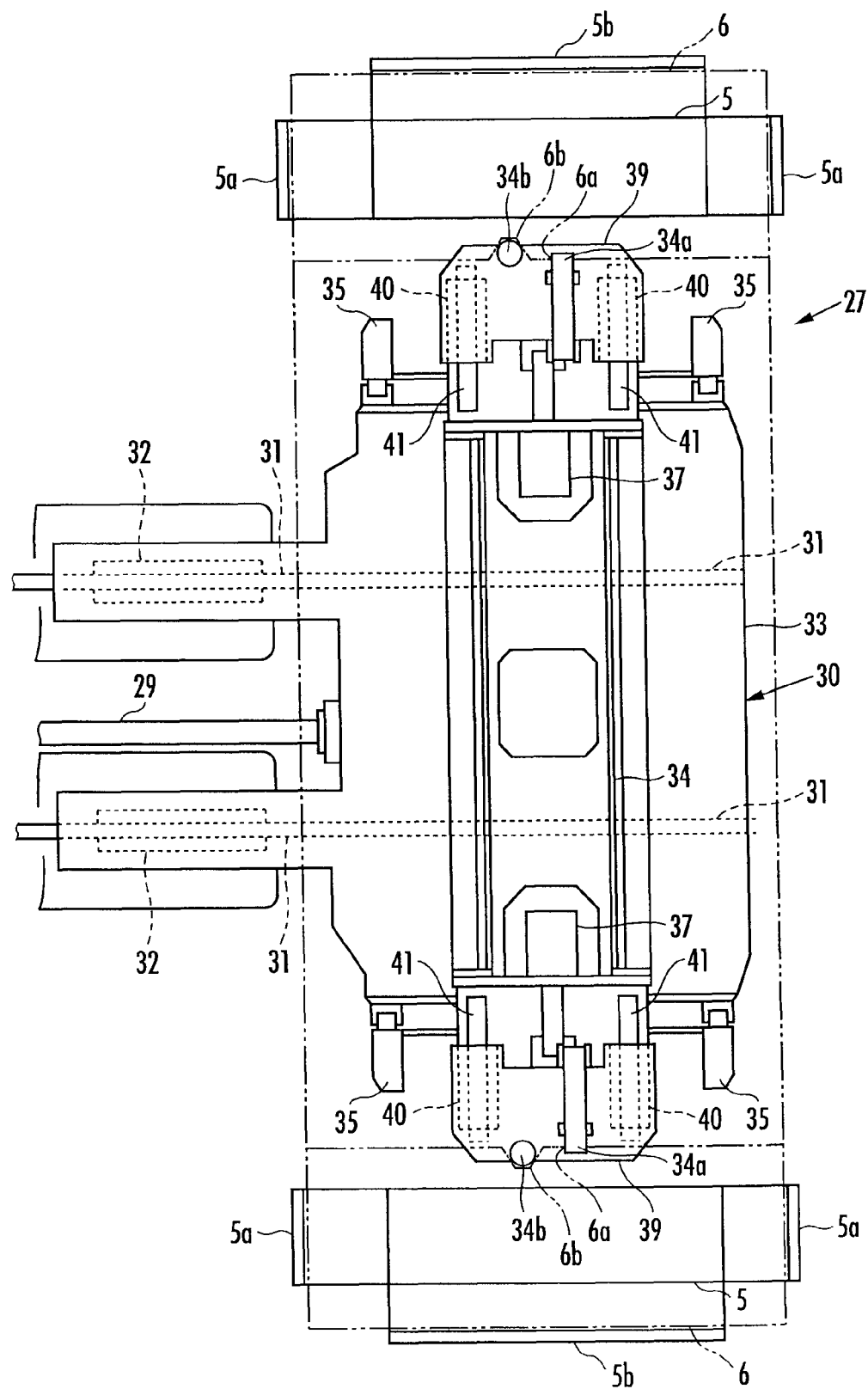
FIG. 4 is an illustrative plan view of workpiece support means.

The workpiece holding portion 5 includes regulation portions 5a and 5b standing along peripheral edges of the pallet 6 as shown in FIG. 4 (detailed configurations of the regulation portions 5a and 5b are omitted in FIGS. 2 and 3), and regulates the pallet 6 in the fore-aft and lateral directions when holding the pallet 6 to prevent displacement of the pallet 6 under conveyance.

As shown in FIG. 3, the movable stand 9 in the embodiment includes a pair of sliding members 16 on the opposite sides on a lower surface thereof, and each sliding member 16 slidably engages a rail 18 provided on a base 17. The rail 18 extends along a moving direction of the moving plate 4 over the entire operation area in which the movable stand 9 is provided.

The movable stand 9 includes a drive motor 19 as movable stand driving means at a rear end thereof, and a pinion gear 21 at a tip of a rotating shaft 20 of the drive motor 19. The pinion gear 21 engages a rack 22 extending in the conveying direction at a side edge of the base 17. The drive motor 19 is driven and controlled by movable stand driving control means 23 shown in FIG. 2.

The movable stand 9 also includes a rotating table 24 that is retraction means. As shown in phantom in FIG. 2, the rotating table 24 is provided rotatably and securably at a desired rotation position (that is, a position different from the workpiece conveying means 3). Further, as shown in FIG. 3, the operation means 10 is mounted on the rotating table 24 via a base frame 25. The operation means 10 is controlled depending on the predetermined operation performed in the operation area by operation control means 26 shown in FIG. 2. Further, as shown in FIG. 3, workpiece support means 27 that supports the pallet 6 supporting the workpiece 2 separately from the workpiece holding portion 5 of the workpiece conveying means 3 is provided on the base frame 25.

As shown in FIG. 3, the workpiece support means 27 includes a cylinder 28 secured to the base frame 25, a pallet connector 30 that is mounted to a rod 29 of the cylinder 28 and removably connects to the pallet 6, a pair of rails 31 provided on a lower surface of the pallet connector 30 in parallel with the rod 29, and rail receiving members 32 that slidably engage the rails 31. The rail receiving members 32 are secured to the base frame 25. The cylinder 28 advances the pallet connector 30 toward the workpiece holding portion 5 of the workpiece conveying means 3 by extension of the rod 29, or retracts the pallet connector 30 apart from the workpiece conveying means 3 by contraction of the rod 29.

As shown in FIG. 4, the pallet connector 30 includes a base plate 33 connected to the rod 29 of the cylinder 28, and the rails 31 on a lower surface of the base plate 33. The base plate 33 includes a hoisting and lowering frame 34 that is hoistable and lowerable, and the hoisting and lowering frame 34 includes a pair of clamp pawls 34a, a pair of locking rollers 34b, and a pallet seating portion 35.

Figure 5:
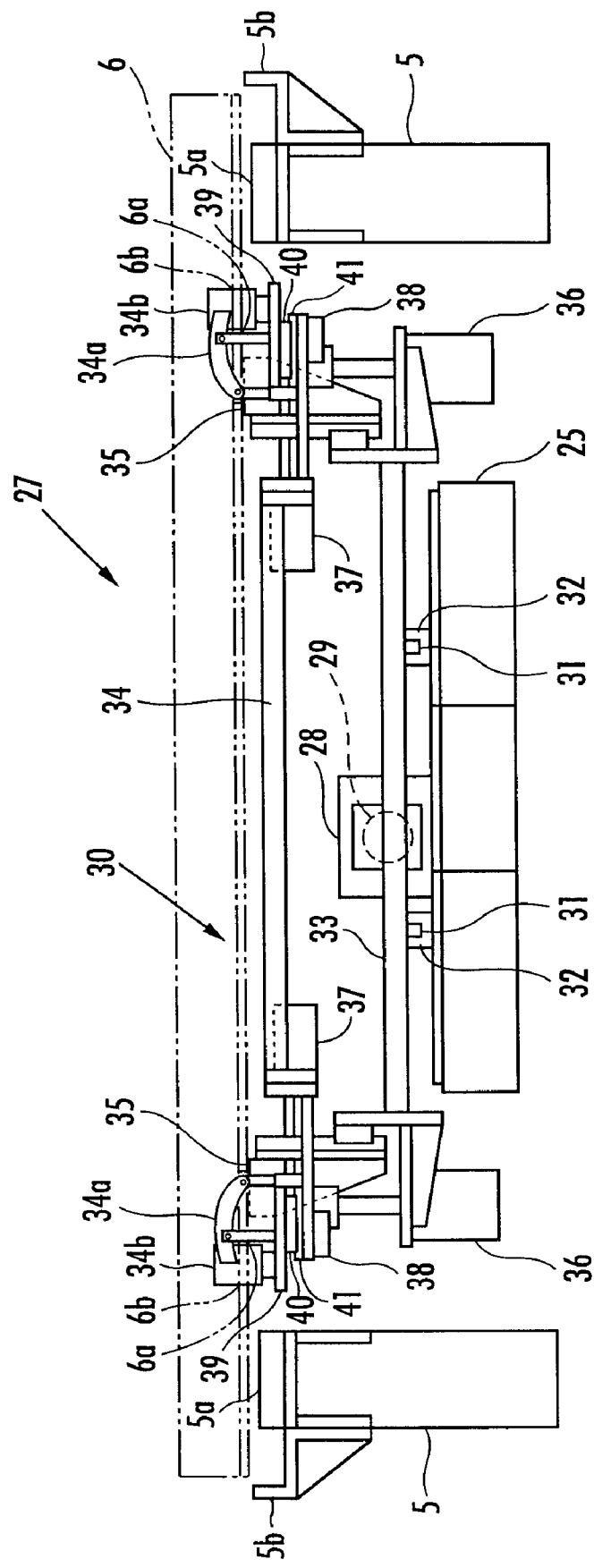
FIG. 5 is an illustrative front view of the workpiece support means.

As shown in FIG. 5, the hoisting and lowering frame 34 is hoisted and lowered by a pair of cylinders 36 provided on the base plate 33. Thus, the rod 29 of the cylinder 28 extends to advance the base plate 33 below the pallet 6 of the workpiece holding portion 5, and the hoisting and lowering frame 34 is hoisted by the cylinder 36 to seat the pallet 6 on the pallet seating portion 35 and separate the pallet 6 from the workpiece holding portion 5.

The clamp pawl 34a is driven by two types of cylinders 37 and 38 provided on the hoisting and lowering frame 34. One cylinder 37 for driving the clamp pawl 34a slides a sliding table 39 on which the clamp pawl 34a is mounted to bring the clamp pawl 34a close to or apart from the pallet 6. A sliding operation of the clamp pawl 34a by the cylinder 37 is smoothly performed by a sliding guide 40 secured to the sliding table 39 and a sliding rail 41 secured to the hoisting and lowering frame 34. The other cylinder 38 oscillates the clamp pawl 34a to clamp and release the pallet 6.

Each clamp pawl 34a clamps the pallet 6 via a grip portion 6a at an inner edge of a bottom plate of the pallet 6. Each locking roller 34b is rotatably provided on the sliding table 39, and locks in the recess 6b in the inner edge of the bottom plate of the pallet 6 by the advance of the sliding table 39. Then, when the pallet connector 30 and the pallet 6 are connected, the pallet 6 is first hoisted by the hoisting and lowering frame 34 and separated from the workpiece holding portion 5, and the sliding table 39 is then advanced to lock each locking roller 34b in the recess 6b in the inner edge of the bottom plate of the pallet 6. Then, each clamp pawl 34a is oscillated to grip the grip portion 6a at the inner edge of the bottom plate of the pallet 6. Thus, the pallet 6 is connected to the pallet connector 30 by locking of each locking roller 34b and clamping of the clamp pawl 34a, thereby reliably preventing a horizontal movement or accidental removal of the pallet 6 supported by the workpiece support means 27, and allowing a relative position between the operation means 10 and the workpiece 2 on the pallet 6 to be maintained with high accuracy.

Figure 6:
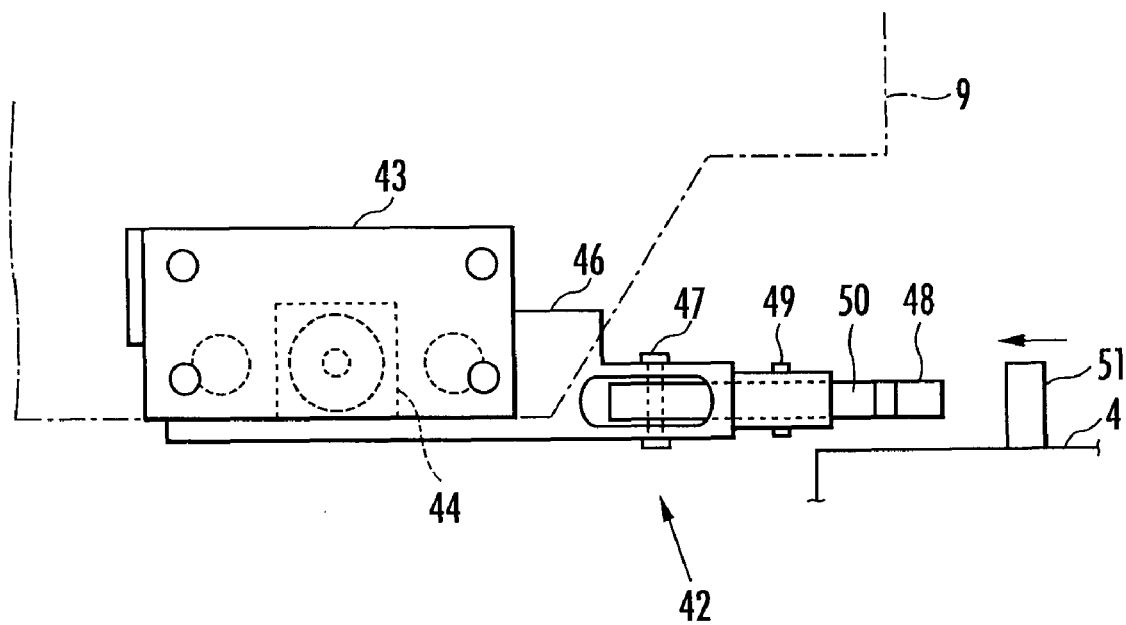
FIG. 6 is an illustrative plan view of connecting means.
Figure 7:
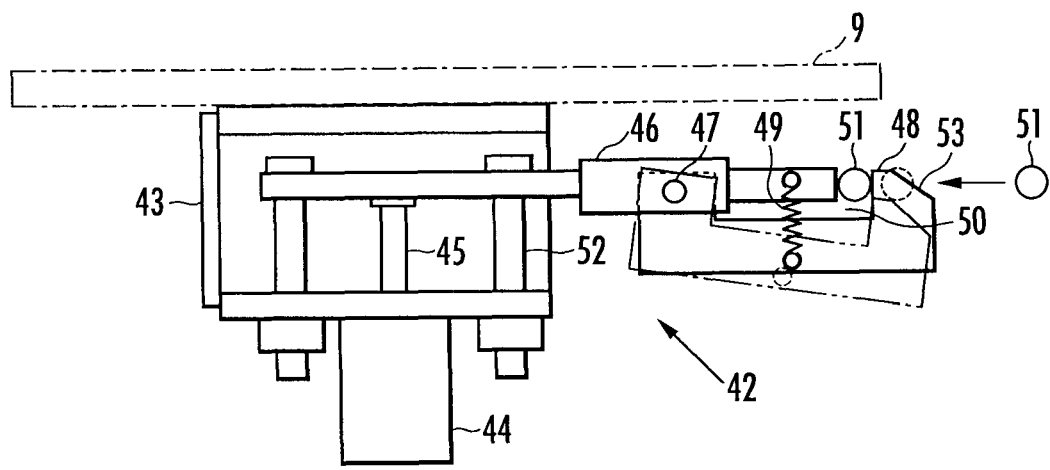
FIG. 7(a) illustrates an operation of the connecting means.
FIG. 7(b) illustrates an operation of the connecting means.
Figure 7:
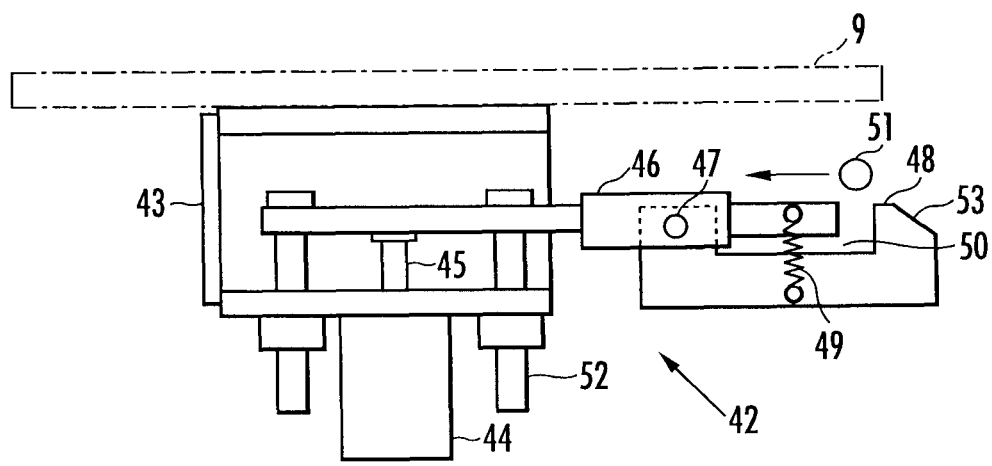

As shown in FIGS. 2 and 3, the movable stand 9 includes connecting means 42 for mechanically connecting to the moving plate 4 of the workpiece conveying means 3. As shown in FIGS. 6, 7(a) and 7(b), the connecting means 42 includes a cylinder 44 provided on a side edge of the movable stand 9 via a mounting member 43, a lock pawl 48 mounted to a lock pawl mounting member 46 mounted to a rod 45 of the cylinder 44 rotatably around a shaft 47, and a spring 49 that is mounted between the lock pawl 48 and the lock pawl mounting member 46 and contracts so that the lock pawl 48 is locked. Further, the lock pawl 48 has an engagement recess 50, and an engagement pin 51 that engages the engagement recess 50 is provided on the moving plate 4 of the workpiece conveying means 3. Reference numeral 52 denotes a guide member of the cylinder 44. The connecting means 42 also includes unshown load detection means for detecting a load placed on the engagement recess 50 by the engagement pin 51 when the engagement pin 51 engages the engagement recess 50. The load detection means detects a change of the load placed on the engagement recess 50 by the engagement pin 51 in accordance with a difference between the moving speed of the movable stand 9 and the conveying speed of the workpiece conveying means 3.

An operation of the connecting means 42 will be described. When the moving plate 4 including the workpiece holding portion 5 of the workpiece conveying means 3 enters the operation area, as shown in FIG. 7(a), the engagement pin 51 of the moving plate 4 first abuts an inclined portion 53 of the lock pawl 48 and presses the lock pawl 48 downward against a contraction force of the spring 49. Then, when the lock pawl 48 is rotated around the shaft 47 and the engagement pin 51 engages the engagement recess 50, the lock pawl 48 returns to the original state by the contraction force of the spring 49. Thus, the movable stand 9 is connected to the moving plate 4 including the workpiece holding portion 5 of the workpiece conveying means 3. For releasing the connection by the connecting means 42, the rod 45 of the cylinder 44 is contracted. Thus, as shown in FIG. 7(b), the lock pawl 48 and the lock pawl mounting member 46 are moved downward to separate the engagement pin 51 from the engagement recess 50, thereby releasing the engagement pin 51 from locking.

Next, an operation of the conveying operation device of the embodiment will be described. Different operations are performed by the operation means 10 in the operation areas A to H, but drive control of the movable stands 9 provided in the operation areas A to H is performed substantially in the same manner. Thus, one of the operation areas A to H will be described.

With reference to FIGS. 2 and 3, the moving plate 4 of the workpiece conveying means 3 conveys the workpiece 2 at a substantially constant speed (about 86 mm/sec in the embodiment). The movable stand 9 is stopped and on standby at the leading end of the corresponding operation area.

When the moving plate 4 holding the workpiece 2 in the workpiece holding portion 5 approaches the operation area, the movable stand 9 starts to be moved by driving by the drive motor 19. At this time, the drive motor 19 of the movable stand 9 is subjected to speed control to increase the moving speed of the movable stand 9 to a predetermined speed (about 40 mm/sec in the embodiment) by the movable stand driving control means 23. Then, when the moving plate 4 holding the workpiece 2 enters the operation area, the moving plate 4 reaches the movable stand 9 because the moving speed of the movable stand 9 is lower than the moving speed of the moving plate 4, and the movable stand 9 is connected to the moving plate 4 by the connecting means 42. From this time, the drive motor 19 of the movable stand 9 is subjected to torque control by the movable stand driving control means 23, and the movable stand 9 is moved in synchronization with the moving plate 4.

The torque control is performed based on the load change detected by the load detection means provided in the connecting means 42. This allows the movable stand 9 and the workpiece conveying means 3 to be synchronized with each other with high accuracy without placing an excessive load on the workpiece conveying means 3 to which the movable stand 9 is connected. Further, as described above, the movable stand driving control means 23 performs the speed control of the drive motor 19 of the movable stand 9 prior to the connection by the connecting means 42, and this aids the movement of the movable stand 9 to sufficiently reduce a shock exerted on the workpiece conveying means 3 by the connection by the connecting means 42.

Next, with reference to FIG. 3, the pallet connector 30 of the workpiece support means 27 provided on the base frame 24 of the movable stand 9 is advanced below the pallet 6 of the workpiece holding portion 5, and the pallet connector 30 connects to the pallet 6 and hoists the pallet 6. Thus, the workpiece 2 is supported by the workpiece support means 27 of the movable stand 9 immediately above the workpiece holding portion 5, and the movable stand 9 moved in synchronization with the moving plate 4 of the workpiece conveying means 3 conveys the workpiece 2 supported by the pallet 6 (an operation area conveying step).

Then, while keeping the state where the movable stand 9 is moved in synchronization with the moving plate 4 of the workpiece conveying means 3, the operation means 10 of the movable stand 9 is controlled by the control by the operation control means 26 to perform a predetermined operation on the workpiece 2 and complete the operation in the operation area (a conveying time operation step). At this time, the workpiece 2 is supported by the workpiece support means of the movable stand 9, thereby allowing the relative position between the operation means 10 and the workpiece 2 to be maintained with high accuracy, and allowing the operation on the workpiece 2 to be performed by the operation means 10 with high accuracy.

When the predetermined operation on the workpiece 2 by the operation means 10 is completed, the workpiece support means 27 of the movable stand 9 transfers the workpiece 2 and the pallet 6 to the workpiece holding portion 5 of the moving plate 4 at the trailing end of the operation area, and the pallet connector 30 is retracted from below the pallet 6 on the workpiece holding portion 5. Then, the connection between the movable stand 9 and the moving plate 4 by the connecting means 42 is released, and the movable stand 9 is returned to the leading end side of the corresponding operation area and is on standby until a next workpiece 2 is conveyed.

Figure 8:
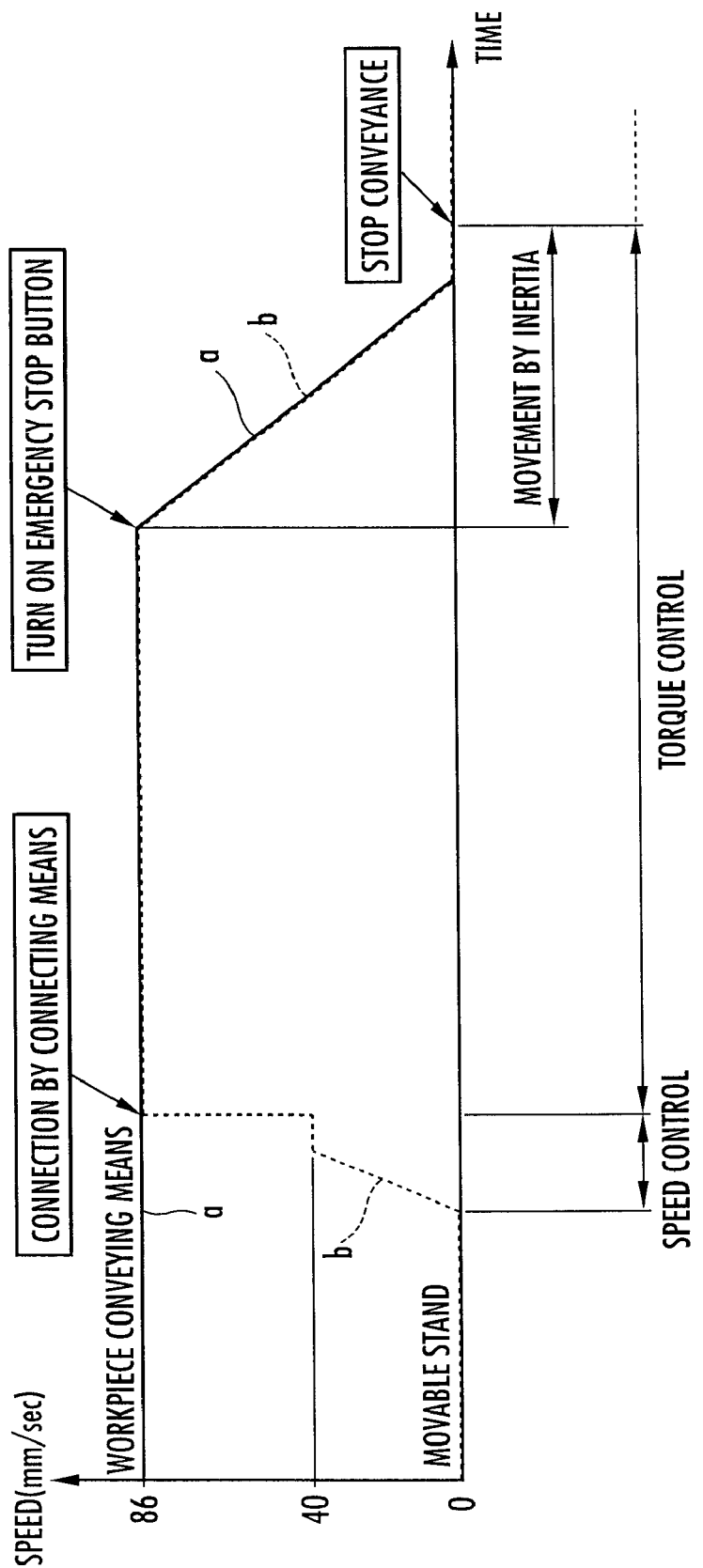
FIG. 8 is a diagram showing operations of workpiece conveying means and a movable stand in the embodiment.

Next, the case where the operation area conveying step is stopped, and the conveying time operation step is suspended will be described with reference to FIG. 8. First, as described above, the moving plate 4 holding the workpiece 2 enters the corresponding operation area, the movable stand 9 receives the workpiece 2, and the predetermined operation is performed by the operation means 10. In FIG. 8, the line a (the solid line) shows the moving speed of the moving plate 4 of the workpiece conveying means 3, and the line b (the broken line) shows the moving speed of the movable stand 9. In the operation area, the movable stand 9 is connected to the moving plate 4 by the connecting means 42, and then the movable stand 9 is moved in synchronization with the moving plate 4 by torque control of the drive motor 19 by the movable stand driving control means 23.

The workpiece conveying means 3 can be stopped by the operator operating the emergency stop buttons if required or if some problem occurs on the conveying path 1 including the operation areas A to H as described above. When the emergency stop buttons are operated while the conveying time operation step is performed in the operation area, the workpiece conveying means 3 is stopped, and the operation in the conveying time operation step is also stopped. Then, immediately, the operation control means 26 controls the operation means 10 so as to continue and complete remaining operations among the suspended predetermined operations (a stop time operation step). At this time, as shown in FIG. 8, driving of the moving plate 4 of the workpiece conveying means 3 by the driving means is released, and the moving plate 4 is gradually reduced in speed by the inertia for a short time and stopped. On the other hand, the movable stand 9 is connected to the moving plate 4 by the connecting means 42, and the drive motor 19 of the movable stand 9 is subjected to the torque control by the movable stand driving control means 23, and thus the reduction in speed of the moving plate 4 by the inertia is followed by a reduction in speed of the movable stand 9, and the movable stand 9 is stopped in synchronization with the moving plate 4. Thus, no shock caused by the reduction in speed of the moving plate 4 is exerted on the movable stand 9, and even at the reduced speed of the movable stand 9, the operation means 10 can continue the remaining operations with high accuracy to complete the predetermined operations. Then, the workpiece 2 having been subjected to the predetermined operation is transferred from the workpiece support means 27 of the movable stand 9 to the workpiece holding portion 5 of the moving plate 4, then the connection between the movable stand 9 and the moving plate 4 by the connecting means 42 is released, and the movable stand 9 is returned to the leading end side of the operation area. The stop time operation step is performed with the workpiece conveying means 3 being stopped, but even if the movement of the workpiece conveying means 3 is restarted while the operation means 10 continues the predetermined operation in the stop time operation step, the drive motor 19 of the movable stand 9 is subjected to the torque control by the movable stand driving control means 23, and thus the movement of the workpiece conveying means 3 is followed by the movable stand 9 and the movable stand 9 restarts the synchronous movement, thereby allowing the predetermined operation to be completed by the operation means 10 without problems.

Then, when the workpiece conveying means 3 is stopped, the predetermined operations can be completed in the operation areas A to H substantially in the same manner. Thus, when the movement of the workpiece conveying means 3 is restarted, one cycle operation for each of the operation areas A to H is completed. Thus, according to the present invention, the stop of the workpiece conveying means 3 does not affect the advance of the operations in the operation areas A to H, the conveying operation device can be applied to the production line in which the independent operations are performed on the workpieces 2 conveyed in the endless conveying path in the plurality of operation areas A to H, and the reduction in production efficiency caused by the stop of the workpiece conveying means 3 can be reliably prevented.

Next, a different operation of the conveying operation device of the embodiment will be described. The predetermined operation (for example, a normal operation such as an assembly operation) for each of the operation areas A to H by the operation means 10 is as described above.

On the other hand, operation means 10 sometimes performs a different predetermined operation (for example, an operation different from the normal operation, such as a teaching operation or an operation test of a robot that is the operation means 10) on the workpiece 2 conveyed from the workpiece holding portion 5 of the moving plate 4. At this time, the workpiece support means 27 of the movable stand 9 supports the workpiece 2 immediately above the workpiece holding portion 5, then the workpiece support means 27 is retracted by the contraction of the rod 29 of the cylinder 28, and the rotating table 24 is rotated as shown in FIG. 2 with the pallet connector 30 of the workpiece support means 27 connecting to and holding the pallet 6 (a retraction step).

When the rotation of the rotating table 24 is stopped, the workpiece support means 27 is advanced by the extension of the rod 29 of the cylinder 28, and a relative position between the operation means 10 and the workpiece 2 is the same as in the case of the above described operation means. Thus, the workpiece support means 27 supporting the workpiece 2 is on standby in a position different from the workpiece holding portion 5. At this time, the clamp pawl 34a of the pallet connector 30 of the workpiece support means 27 clamps and firmly connects to the pallet 6, and the locking roller 34b reliably regulates the movement of the pallet 6 in the fore-aft and lateral directions, thereby allowing the relative position between the operation means 10 and the workpiece 2 on the pallet 6 to be reliably maintained with high accuracy.

Then, when the retraction step by the rotation of the rotating table 24 is performed, the operation control means 26 causes the operation means 10 to perform the operation different from the normal operation, such as the teaching operation or the operation test on the workpiece 2 (a different operation step). At this time, the connection between the movable stand 9 and the moving plate 4 by the connecting means 42 may be released, and further, the movable stand 9 may be moved to the original position by driving by the drive motor 19 to perform the different operation step. The connection by the connecting means 42 may be released to prevent synchronous movement of the movable stand 9 and the moving plate 4 when the different operation step is performed, and for example, the predetermined operation to be performed by the operation means 10 on the different workpiece 2 conveyed by the moving plate 4 of the workpiece conveying means 3 can be continued manually by the operator.

Thus, even if the operation different from the normal operation, such as the teaching operation or the operation test requires long time, circulation of the moving plate 4 of the workpiece conveying means 3 is not stopped, thereby preventing a reduction in production efficiency caused by the different predetermined operation.

In the embodiment, the connecting means 42 mechanically connects the movable stand 9 and the moving plate 4, but the movable stand 9 includes the drive motor 19, and thus synchronous control of matching the driving speed of the drive motor 19 with the conveying speed of moving plate 4 may be performed without mechanical connection by the connecting means 42.

What is claimed is:

1. A conveying operation method for conveying a workpiece and performing a predetermined operation on the workpiece, comprising:
    an operation area conveying step of conveying said workpiece by a workpiece conveying means which holds the workpiece in a predetermined position, and moving a movable stand in synchronization with said workpiece conveying means over an operation area provided along a conveying path of the workpiece by said workpiece conveying means;
    a workpiece support step of supporting the workpiece separately from the workpiece conveying means by a workpiece support means provided on said movable stand in said operation area conveying step; and
    an operation step of performing a predetermined operation on the workpiece supported by said workpiece support means by an operation means mounted on said movable stand,
    wherein said operation step includes:
    a conveying time operation step of completing the predetermined operation on the workpiece with the movable stand being moved in synchronization with the movement of the workpiece conveying means in the operation area; and
    a stop time operation step of stopping the movable stand in synchronization with said workpiece conveying means and completing the predetermined operation on the workpiece when the movement of said workpiece conveying means is stopped at an arbitrary position in the operation area and said conveying time operation step is suspended.

2. The conveying operation method according to claim 1, wherein said movable stand includes a drive motor that drives the movement in the operation area in said operation area conveying step, and torque of said drive motor is controlled in accordance with a moving speed of the workpiece conveying means in the conveying time operation step and the stop time operation step.

3. The conveying operation method according to claim 1, wherein said workpiece conveying means is circulated in said conveying path formed in an endless manner,
   a plurality of operation areas in which different operations are performed on the workpiece are provided along said conveying path, and
   said operation step is independently performed for each operation area.

4. The conveying operation method according to claim 1, further comprising:
   a retraction step of retracting the workpiece support means supporting the workpiece from a position on the conveying path of the workpiece by said workpiece conveying means to a different position with a relative arrangement between said workpiece support means and said operation means being maintained in said operation area; and
   a different operation step of performing a different predetermined operation on the workpiece supported by said workpiece support means by said operation means when the workpiece support means is retracted to said different position in said retraction step.

5. The conveying operation method according to claim 1, wherein after the stop time operation step is completed, the workpiece is transferred to the workpiece conveying means and the movable stand is returned to a leading end side of the operation area.

6. The conveying operation method according to claim 1, wherein the movable stand and the workpiece conveying means are mechanically connected by a connecting means, and a moving speed of the workpiece conveying means is controlled based on a change of a load received by the movable stand from the workpiece conveying means via the connecting means.

7. A conveying operation device for conveying a workpiece and performing a predetermined operation on the workpiece, comprising:
   a workpiece conveying means which holds the workpiece in a predetermined position for conveying the workpiece;
   an operation area provided over a predetermined distance along a conveying path of the workpiece by said workpiece conveying means;
   a movable stand that is moved in synchronization with said workpiece conveying means along the conveying path of the workpiece by said workpiece conveying means in said operation area;
   a workpiece support means provided on said movable stand for supporting the workpiece separately from said workpiece conveying means;
   an operation means provided on said movable stand for performing a predetermined operation on the workpiece supported by said workpiece support means;
   a movable stand driving means for moving said movable stand over said operation area;
   movable stand driving control means for controlling the movable stand driving means so that a moving speed of the movable stand by said movable stand driving means matches with a moving speed of the workpiece conveying means; and
   an operation control means for completing the predetermined operation on the workpiece by the operation means in said operation area when said movable stand is moved along the conveying path of the workpiece by said workpiece conveying means,
   wherein when the movement of said workpiece conveying means is stopped in an arbitrary position of said operation area during the operation by said operation means, said movable stand driving control means stops the movable stand in synchronization with the workpiece conveying means, and said operation control means completes the predetermined operation performed by the operation means in said operation area.

8. The conveying operation device according to claim 7, wherein said movable stand driving means is a drive motor, and
   the movable stand driving control means controls torque of said drive motor to control the movement of the movable stand in accordance with the moving speed of the workpiece conveying means.

9. The conveying operation device according to claim 7, wherein said workpiece conveying means is circulated in said conveying path formed in an endless manner,
   a plurality of operation areas in which different operations are performed on the workpiece are provided along said conveying path, and
   said movable stand is independently provided for each operation area.

10. The conveying operation device according to claim 7, further comprising retraction means provided on said movable stand for retracting the workpiece support means supporting the workpiece from a position on the conveying path of the workpiece by said workpiece conveying means to a different position with a relative position between said workpiece support means and said operation means being maintained, and
    said operation control means performs a different predetermined operation on the workpiece supported by said workpiece support means when said retraction means retracts the workpiece support means to said different position.

11. The conveying operation device according to claim 7, wherein after movement of said workpiece conveying means is stopped in the arbitrary position of said operation area during the operation by said operation means and said operation control means has completed the predetermined operation performed by the operation means in said operation area, the workpiece is transferred to the workpiece conveying means and the movable stand is returned to a leading end side of the operation area.

12. The conveying operation device according to claim 7, wherein the movable stand and the workpiece conveying means are mechanically connected by a connecting means, and the moving speed of the workpiece conveying means is controlled based on a change of a load received by the movable stand from the workpiece conveying means via the connecting means.

* * * * *